United States Patent
Nam

(10) Patent No.: US 8,679,574 B2
(45) Date of Patent: Mar. 25, 2014

(54) UNLIMITED MOVABLE PRINTING SYSTEM AND PRINTING METHOD THEREOF

(71) Applicant: Han Seok Nam, Seoul (KR)

(72) Inventor: Han Seok Nam, Seoul (KR)

( * ) Notice: Subject to any disclaimer, the term of this patent is extended or adjusted under 35 U.S.C. 154(b) by 0 days.

(21) Appl. No.: 13/774,507

(22) Filed: Feb. 22, 2013

(65) Prior Publication Data

US 2013/0236633 A1    Sep. 12, 2013

(30) Foreign Application Priority Data

Mar. 8, 2012 (KR) ........................ 10-2012-0024118

(51) Int. Cl.
| | | |
|---|---|---|
| C23C 16/52 | (2006.01) | |
| B05B 3/00 | (2006.01) | |
| B05C 5/00 | (2006.01) | |
| B05C 11/00 | (2006.01) | |
| B05D 1/02 | (2006.01) | |

(52) U.S. Cl.
CPC . B05C 5/00 (2013.01); B05C 11/00 (2013.01); B05D 1/02 (2013.01)
USPC ............................... 427/8; 118/712; 118/323

(58) Field of Classification Search
USPC ....................................... 427/8; 118/323, 712
See application file for complete search history.

(56) References Cited

U.S. PATENT DOCUMENTS

2013/0122186 A1 *   5/2013   Hoppel ............................. 427/8

FOREIGN PATENT DOCUMENTS

| KR | 10-2002-0023526 A | 3/2002 |
| KR | 10-2006-0069562 A | 6/2006 |
| KR | 20-0454961 Y1 | 8/2011 |

* cited by examiner

*Primary Examiner* — Nathan Empie
*Assistant Examiner* — Xiao Zhao
(74) *Attorney, Agent, or Firm* — Frommer Lawrence & Haug LLP; Ronald R Santucci

(57) ABSTRACT

An unlimited movable printing system that allows an operator to accurately and repeatedly print original drawings on a work side and a printing method thereof.

15 Claims, 10 Drawing Sheets

UNLIMITED MOVABLE PRINTING SYSTEM AND PRINTING METHOD THEREOF

CROSS-REFERENCE TO RELATED PATENT APPLICATION

This application claims the benefit of Korean Patent Application No. 10-2012-0024118, filed on Mar. 8, 2012, in the Korean Intellectual Property Office, the disclosure of which is incorporated herein in its entirety by reference.

BACKGROUND OF THE INVENTION

1. Field of the Invention

The present invention relates to a printing system and method thereof, and more particularly to, an unlimited drive type printing system configured to perform a printing job while moving in an unlimited area and a printing method thereof.

2. Description of the Related Art

In times of construction, such as architecture or civil engineering construction, a builder studies the dimensions of a site through an analysis of scaled down drawings and accordingly executes the construction.

In this case, the builder needs to accurately analyze the drawings and control a measurement error. Laymen often manually measure and set a construction site, which ends up causing an error in the construction.

Such a limitation and/or problem in an accurate analysis of drawings in the construction site occurs in a case where specific content is generally attempted to be painted and/or indicated on a work side as well as an architectural and/or civil engineering construction site. That is, in a case where the specific content is generally attempted to be painted and/or indicated on the work side, for example, an advertisement, since an operator manually paints and/or indicates the specific content on the work side by referring to the original drawings, all jobs are obliged to depend on the craftsmanship of the operator. Thus, this becomes problematic in that accuracy terribly deteriorates and the same content is repeatedly painted and/or indicated.

SUMMARY OF THE INVENTION

In order to address the limitation and/or problem of the conventional art, the present invention provides an unlimited movable printing system that allows an operator to accurately and repeatedly print original drawings on a work side and a printing method thereof.

According to an embodiment of the present invention, there is provided an unlimited movable printing system including: an input unit configured to input data regarding content that is to be printed; a storage unit configured to store the data; a printing unit configured to print the content corresponding to the data on a work side; a driving unit configured to unlimitedly move at least a part of the unlimited movable printing system including the printing unit in a work site including the work side; at least one recognition unit located at the work site; a sensing unit configured to sense the at least one recognition unit; a location signal generation unit that is electrically connected to the sensing unit and configured to generate a location signal based on information regarding the at least one recognition unit sensed by the sensing unit; and a control unit that is connected to the input unit, the storage unit, the printing unit, the driving unit, and the location signal generation unit, configured to compare the location signal received from the location signal generation unit with the data, calculate a current location of the at least a part of the unlimited movable printing system including the printing unit, operate the driving unit and the printing unit, and print the content corresponding to the data on the work side.

The sensing unit may include a distance measurement sensor, a light sensor, or a radio wave sensor that is configured to sense the at least one recognition unit.

The unlimited movable printing system comprises an unlimited movable printing apparatus including at least the printing unit, the driving unit, the sensing unit, and the location signal generation unit and a control apparatus comprising the input unit and the storage unit, wherein the control unit includes: a first control unit that is electrically connected to the printing unit, the driving unit, the sensing unit, and the location signal generation unit, and located at the unlimited movable printing apparatus; and a second control unit that is electrically connected to the input unit, and the storage unit, and located at the control apparatus, and wherein the unlimited movable printing apparatus and the control apparatus are configured to communicate with each other.

The unlimited movable printing apparatus may further include a second storage unit.

The unlimited movable printing system may include: an unlimited movable printing apparatus including the printing unit, the driving unit, input unit, the storage unit, the sensing unit, the location signal generation unit, and the control unit.

The input unit may be configured to input data regarding projection content, and wherein the unlimited movable printing apparatus may further include a projection unit configured to project content corresponding to the data regarding the projection content and that is electrically connected to the control unit.

According to another embodiment of the present invention, there is provided a printing method including: inputting and storing data regarding content that is to be printed in an unlimited movable printing apparatus including at least a sensing unit, a location signal generation unit, a driving unit, and a printing unit; sensing at least one recognition unit located at a work site, wherein the sensing is performed by the sensing unit; generating a location signal based on information regarding the sensed at least one recognition unit, wherein the generating is performed by the location signal generation unit that is electrically connected to the sensing unit; comparing the location signal received from the location signal generation unit with the data and calculating a current location of the unlimited movable printing apparatus, wherein the comparing is performed by a control unit that is electrically connected to the location signal generation unit; comparing the current location with the data, wherein the comparing is performed by the control unit; and operating the driving unit and the printing unit, and printing the content corresponding to the data on a work side of the work site from a printing start point, wherein the operating is performed by the control unit, and the printing is performed by the unlimited movable printing apparatus that is moving.

The comparing of the current location with the data may include: in a case where the current location is identical to the printing start point, printing the content corresponding to the data on the work side of the work site from the printing start point, and, in a case where the current location is not identical to the printing start point, operating the driving unit and moving the unlimited movable printing apparatus to the printing start point, wherein the operating is performed by the control unit.

The comparing of the current location with the data may further include: in a case where the current location is not identical to the printing start point, determining whether a difference between the current location and the printing start point is allowable, in a case where it is determined that the difference is allowable, printing the content corresponding to the data on the work side of the work site from the printing start point, and, in a case where it is determined that the difference is not allowable, operating the driving unit and moving the unlimited movable printing apparatus to the printing start point, wherein the operating is performed by the control unit.

The comparing of the current location with the data may further include: in a case where the current location is not identical to the printing start point, determining whether the difference between the current location and the printing start point is within a previously set error range, in a case where it is determined that the difference is within the previously set error range, printing the content corresponding to the data on the work side of the work site from the printing start point, and, in a case where it is determined that the difference exceeds the previously set error range, operating the driving unit and moving the unlimited movable printing apparatus to the printing start point, wherein the determining is performed by the control unit.

The calculating of the current location of the unlimited movable printing apparatus may include: calculating a first location of the unlimited movable printing apparatus; and calculating a second location of the unlimited movable printing apparatus, wherein the comparing of the current location with the data includes: determining whether the first location is identical to the printing start point; and comparing whether the second location is identical to a printing end point.

The printing method may further include: in a case where the second location is identical to the printing end point, operating the printing unit and ending the printing, and, in a case where the second location is not identical to the printing end point, calculating a remaining distance, wherein the operating is performed by the control unit.

The printing method may further include: in a case where the second location is identical to the printing end point, operating the printing unit and ending the printing, and, in a case where the second location is not identical to the printing end point, determining whether a difference between the second location and the printing end point is allowable, wherein the operating is performed by the control unit.

The printing method may further include: inputting and storing data regarding projection content in the unlimited movable printing apparatus; and projecting the projection content onto a projection side of a work site through the unlimited movable printing apparatus, wherein the projecting is performed by the control unit.

The printing method may further include: simulating the content that is to be printed, wherein the simulating is performed by the unlimited movable printing apparatus that is moving.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
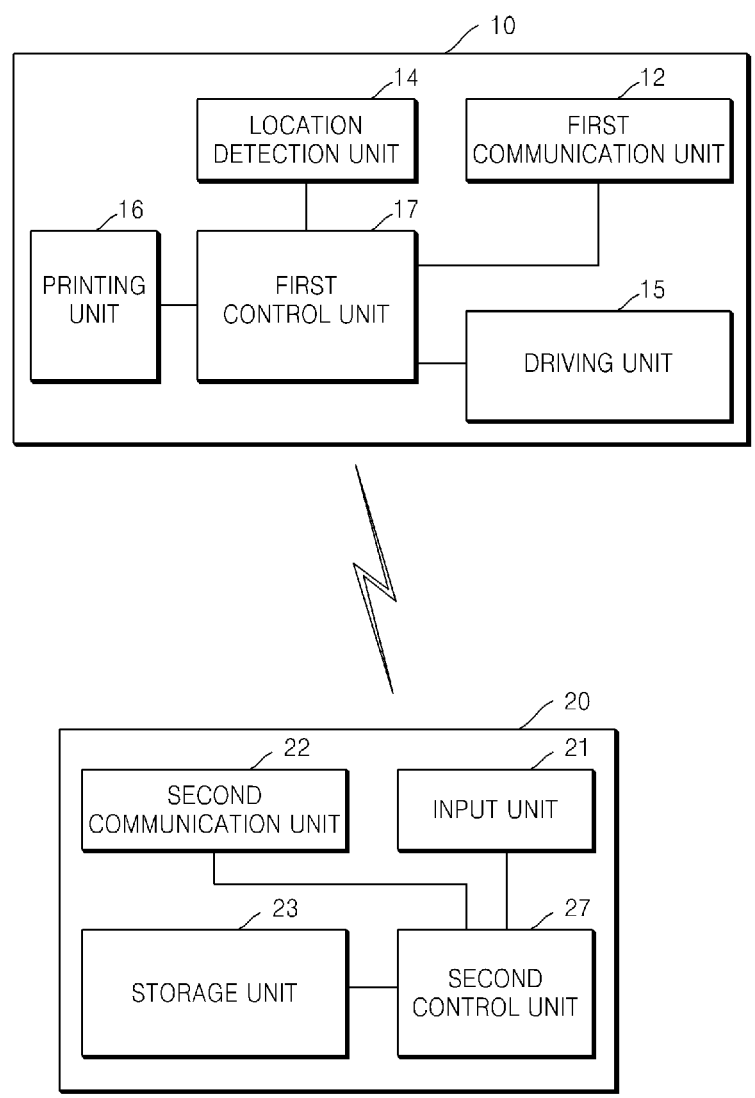
FIG. 1 is a block diagram of an unlimited movable printing system according to an embodiment of the present invention.

Reference will now be made in detail to the present embodiments of the present invention, examples of which are illustrated in the accompanying drawings, wherein like reference numerals refer to like elements throughout. As used herein, the term "and/or" includes any and all combinations of one or more of the associated listed items.

FIG. 1 is a block diagram of an unlimited movable printing system according to an embodiment of the present invention.

Referring to FIG. 1, the unlimited movable printing system according to an embodiment of the present invention includes an unlimited movable printing apparatus 10 and a control apparatus 20.

The unlimited movable printing apparatus 10 includes a location detection unit 14 for sensing location information regarding a job site, a driving unit 15 for moving the unlimited movable printing apparatus 10, a printing unit 16 for performing a printing job on a work side of the work site, a first communication unit 12 for communicating with the control apparatus 20, and a first control unit 17 for controlling the whole unlimited movable printing apparatus 10.

The control apparatus 20 includes an input unit 21 for inputting data, a storage unit 23 for storing the data, a second communication unit 22 for communicating with the unlimited movable printing apparatus 10, and a second control unit 27 for controlling the whole control apparatus 20.

The location detection unit 14 detects a location of the unlimited movable printing apparatus 10, senses information regarding the work site, and transmits location data to the first control unit 17.

Figure 2:
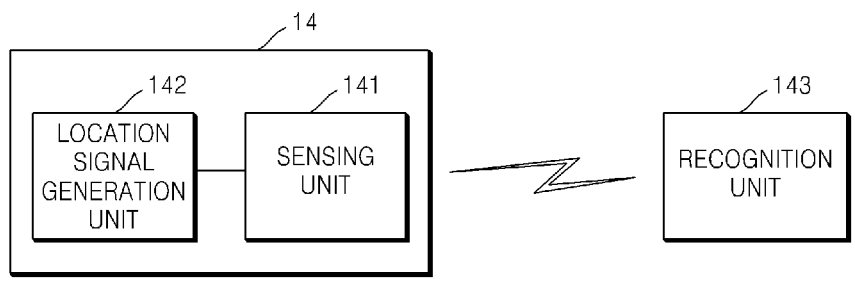
FIG. 2 is a block diagram of an example of a location detection unit of FIG. 1.

FIG. 2 is a block diagram of an example of the location detection unit 14 of FIG. 1. The location detection unit 14 of FIG. 2 includes a sensing unit 141 and a location signal generation unit 142.

The sensing unit 141 senses a current location of the unlimited movable printing apparatus 10 disposed in a work site.

For example, the sensing unit 141 may sense a recognition unit 143 having various types disposed at the work site. The sensing unit 141 for sensing the recognition unit 143 may include a distance measurement sensor using a light wave, a radio wave, a sound wave, or an image, or an image measurement sensor using an image, etc.

As another example, the sensing unit 141 may be a GPS receiving unit. That is, the sensing unit 141 receives a GPS signal to detect the current location of the unlimited movable printing apparatus 10. In this case, the recognition unit 143 of FIG. 2 is not used.

The sensing unit 141 is electrically connected to the location signal generation unit 142. The location signal generation unit 142 generates a location signal based on information sensed by the sensing unit 141, transmits the location signal to the first control unit 17 so that the current location on original data may be calculated. The location signal may be transmitted to the second control unit 27 through the first control unit 17. The calculation of the current location may be performed by the first control unit 17 and/or the second control unit 27.

Figure 3:
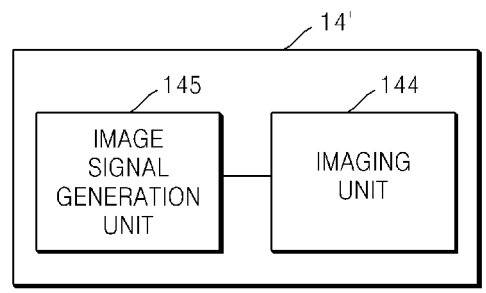
FIG. 3 is a block diagram of another example of the location detection unit of FIG. 1.

FIG. 3 is a block diagram of a location detection unit 14' as another example of the location detection unit 14 of FIG. 1. The location detection unit 14' of FIG. 3 includes an imaging unit 144 and an image signal generation unit 145.

The imaging unit 144 may include a camera unit such as a CCD camera to capture a work site. The imaging unit 144 may be used to capture a specific recognition of the work site.

The image signal generation unit 145 is electrically connected to the imaging unit 144 and generates an image signal based on an image captured by the imaging unit 144. The image signal is transmitted to the first control unit 17 to calculate and/or confirm a current location on original data. The image signal may be transmitted to the second control unit 27 through the first control unit 17. The calculation and/or confirmation of the current location may be performed by the first control unit 17 and/or the second control unit 27.

The location detection units 14 and 14' detect a location of the unlimited movable printing apparatus 10 at a step of starting a printing job as well as detect the current location of the unlimited movable printing apparatus 10 during the printing so that feedback on whether there is an error in the printing can be provided.

Any driving units are applicable to the driving unit 15 as long as they can move the unlimited movable printing apparatus 10. For example, the driving unit 15 may include a motor and wheels to travel the work site. The motor and wheels can be connected to a separate rotational shaft to allow the driving unit 15 to turn directions. A unit for running an uneven tomography like a caterpillar can be also employed as the driving unit 15.

Any units are applicable to the printing unit 16 as long as they can perform a printing job on a work side.

Figure 4:
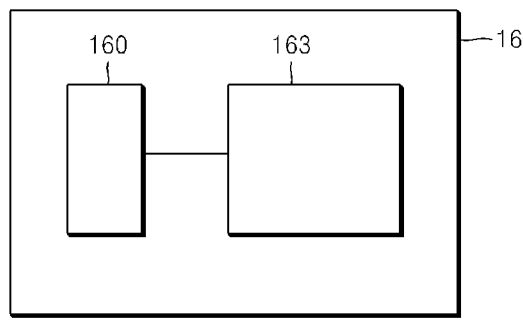
FIG. 4 is a block diagram of an example of a printing unit of FIG. 1.

FIG. 4 is a block diagram of an example of the printing unit 16 of FIG. 1. The printing unit 16 includes a nozzle unit 160 for ejecting ink and an ink supply unit 163. The nozzle unit 160 includes a nozzle head (not shown) used to eject ink. Also, according to circumstances, the nozzle unit 160 may include a head driving unit (not shown) to allow the nozzle head to turn directions. The ink supply unit 163 may include at least one ink storage tank, and a pump unit and a valve unit that are connected to the nozzle unit 160 to convey ink.

Figure 5:
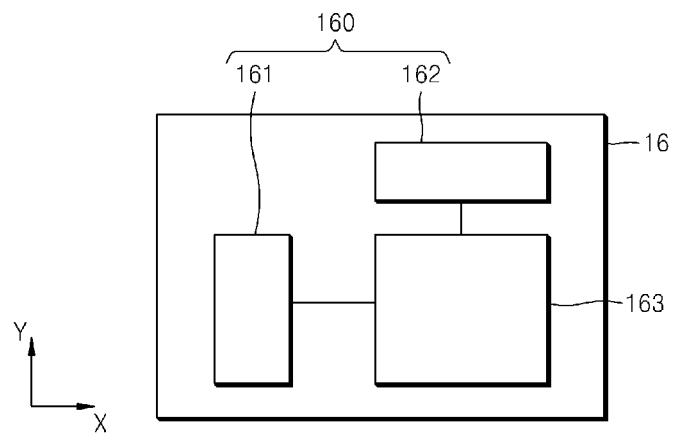
FIG. 5 is a block diagram of another example of the printing unit of FIG. 1.

FIG. 5 is a block diagram of another example of the printing unit 16 of FIG. 1. The nozzle unit 160 of the printing unit 16 includes a first nozzle unit 161 for performing a printing job in an X-axis direction and a second nozzle unit 162 for performing a printing job in a Y-axis direction. The first nozzle unit 161 and the second nozzle unit 162 are connected to the ink supply unit 163.

The printing unit 16 is not limited to spraying a liquid pigment such as ink and may spray a solid or gel pigment.

The printing unit 16 may use a pen type unit or a brush type unit. For example, the pen type unit or a brush type unit may be used to rub a fluid, such as ink or paste, or gel pigment or solid pigment directly on a work side.

Figure 6:
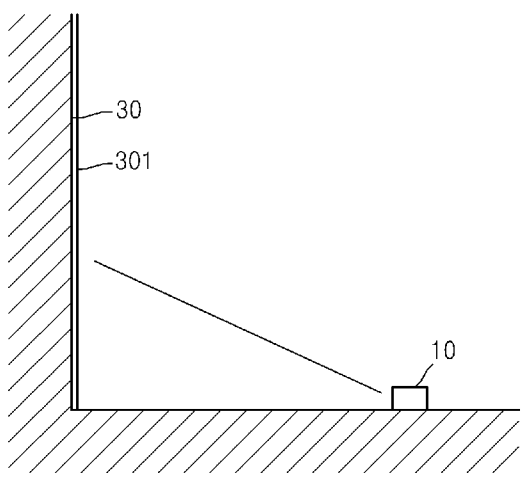
FIG. 6 is a diagram of another example of the printing unit of FIG. 1.

FIG. 6 is a diagram of another example of the printing unit 16 of FIG. 1. The unlimited movable printing apparatus 10 is applied to a work side 30 that is a place on which the unlimited movable printing apparatus 10 has difficulty in directly moving such as a wall or a ceiling other than the ground. In this case, the printing unit 16 may be configured to irradiate light having a straightness like laser. In this regard, a specific pigment 301 is coated on the work side 30 and may be discolored and/or modified in response to the light irradiated from the printing unit 16. Therefore, the unlimited movable printing apparatus 10 does not perform a printing job while directly moving along the work side 30, and instead, the unlimited movable printing apparatus 10 may perform the printing job on data input by irradiating light onto the work side 30 while moving along the work side 30 on which the pigment 301 is coated. This embodiment is not necessarily intended for a work side other than a floor side and may be intended for the work side other than the floor side according to a site condition.

The printing unit 16 may modularize, select, and exchange the printing unit 16 having a variety of types described above.

The unlimited movable printing apparatus 10 may further include a power supply unit although not shown. The power supply unit may use a rechargeable battery or a power supplier connected by wires.

The input unit 21 included in the control apparatus 20 is a unit by which a user may personally input data of content that is to be printed using an electronic device such as an external memory or other input devices. The input unit 21 may be connected to a transmitting/receiving unit (not shown) including a wired and/or wireless transmission/reception unit, receive the data of the content that is to be printed from an external device, and store the data in the storage unit 23.

The storage unit 23 stores the data and sends the data to the second control unit 27 so that the second control unit 27 generates a printing signal.

The second communication unit 22 is configured to communicate with the first communication unit 21 by wires or wirelessly. Thus, the second communication unit 22 sends the printing signal generated by the second control unit 27 to the first communication unit 21 and the first control unit 17 through the second communication unit 22. The first control unit 17 transfers the printing signal to the printing unit 16 to perform a printing job. As described above, the unlimited movable printing apparatus 10 may include a storage unit (not shown) to store the printing signal and the data received from the control apparatus 20.

The second control unit 27, as will be described later, may receive various types of data including data regarding a current location determined by the unlimited movable printing apparatus 10 through the first communication unit 21 and the second communication unit 22, compare original data with the received data, determine whether to perform a printing and/or moving job, generate the printing signal and/or a movement signal according to a result of the determination, and transmit the printing signal and/or the movement signal to the unlimited movable printing apparatus 10 through the second communication unit 22 and the first communication unit 21. The second control unit 27 may also indicate a difference between the measured data and the original data and/or an error thereof in the original data. The difference between the measured data and the original data and/or the original data in which the error is indicated may be stored in the storage unit 23. As described above, the second control unit 27 may provide a command to the unlimited movable printing apparatus 10 regarding whether to perform the printing and/or moving job, feedback the original data based on the measured data obtained through the unlimited movable printing apparatus 10, and provide a command to the unlimited movable printing apparatus 10 to perform a simulation operation.

Figure 7:
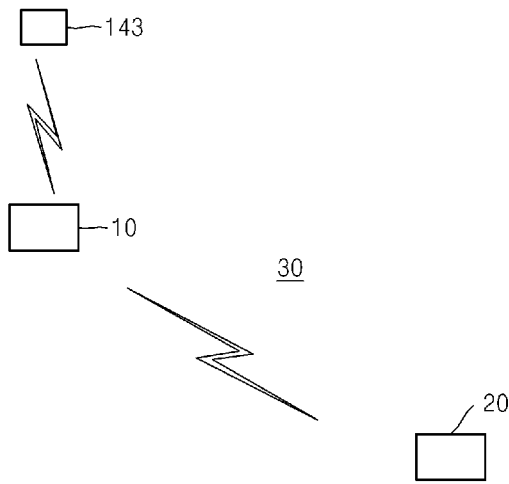
FIG. 7 is a diagram of an example for explaining an installation status of the unlimited movable printing system of FIG. 1.

The above-described unlimited movable printing system is disposed at a work site including the work side, as shown in FIG. 7. The recognition unit 143 may be installed in the work site so that the unlimited movable printing apparatus 10 recognizes the current location of the unlimited movable printing apparatus 10. The control apparatus 20 may be disposed outside of the work side 30, such as an office space outside the work site or the outside of the work side 30 in the work site. A computer apparatus of the user may be used as the control apparatus 20.

The above-described unlimited movable printing system may perform a printing job.

Figure 8:
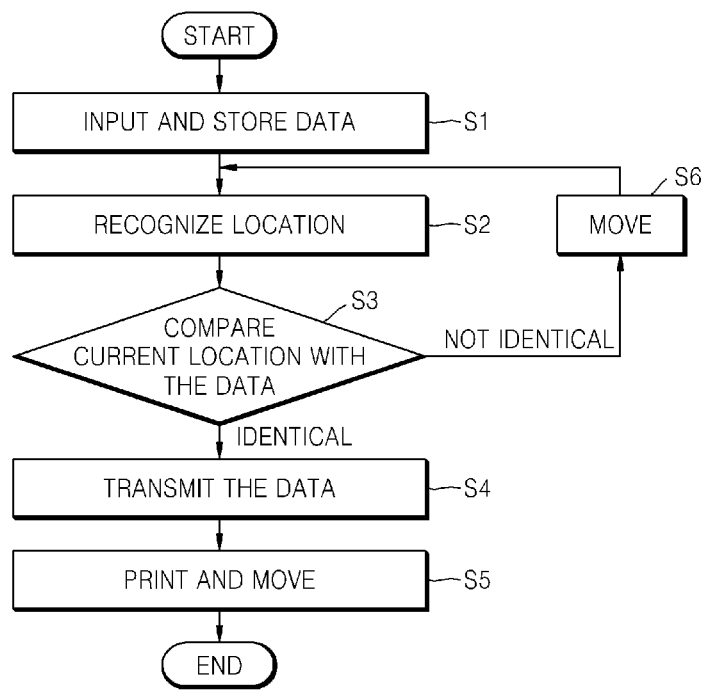
FIG. 8 is a flowchart of an example of a printing method performed by the unlimited movable printing system of FIG. 1.

FIG. 8 is a flowchart of an example of a printing method performed by the unlimited movable printing system of FIG. 1. The printing method performed by the unlimited movable printing system will now be described with reference to FIG. 8 below.

First, content to be printed, for example, data regarding a building blueprint, is input through the input unit 21 and then stored in the storage unit 23 (operation S1). The second control unit 27 generates a printing signal based on the data. The printing signal includes data regarding the content to be printed.

Next, the location detection unit 14 of the unlimited movable printing apparatus 10 disposed at a work site recognizes a current location (operation S2).

Figure 9:
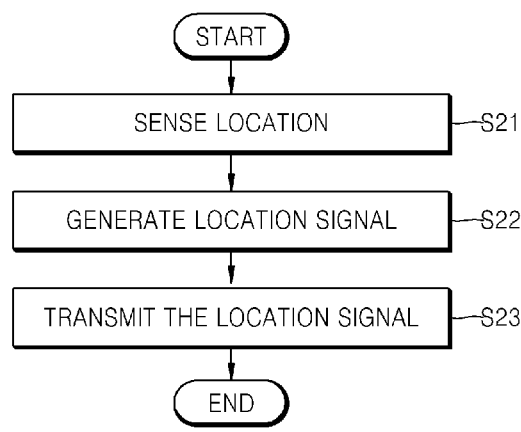
FIG. 9 is a flowchart of a detailed example of an operation of recognizing a location of FIG. 8.

More specifically, as shown in FIG. 9, the sensing unit 141 senses a location (operation S21). The location signal generation unit 142 generates a location signal based on the location (operation S22). The location signal is transmitted to the first control unit 17 and then to the second control unit 27 through the first communication unit 12 and the second communication unit 22 (operation S23). The second control unit 27 compares the input data with the location signal (operation S3) and recognizes a current location of the unlimited movable printing apparatus 10 from the data.

Figure 10:
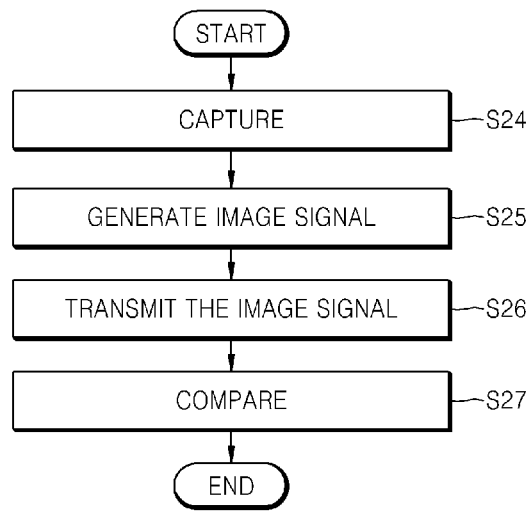
FIG. 10 is a flowchart of another detailed example of an operation of recognizing a location of FIG. 8.

In a case where the location detection unit 14' includes the imaging unit 144 and the image signal generation unit 145 as shown in FIG. 3, as shown in FIG. 10, the work site is captured by the imaging unit 144 (operation S24). The image signal generation unit 145 generates an image signal based on the captured work site (operation S25). The image signal is transmitted to the first control unit 17 and then to the second control unit 27 through the first communication unit 12 and the second communication unit 22 (operation S26). The second control unit 27 compares the input data with the image signal (operation S27) and recognizes a current location of the unlimited movable printing apparatus 10 from the data.

The second control unit 27 compares the recognized current location with the data (operation S3).

In a case where the current location is identical to a printing start point, the second control unit 27 transmits the printing signal including the data regarding the content to be printed to the first control unit 17 through the second communication unit 22 and the first communication unit 12 (operation S4). The first control unit 17 operates the driving unit 15 and the printing unit 16 to allow the unlimited movable printing apparatus 10 to perform a printing job while moving (operation S5).

Otherwise, in a case where the current location is not identical to the printing start point, the second control unit 27 transmits a movement signal to the first control unit 17 through the second communication unit 22 and the first communication unit 12. The first control unit 17 operates the driving unit 15 to allow the unlimited movable printing apparatus 10 to move (operation S6).

The unlimited movable printing system discovers the printing start point and prints content corresponding to the input data by repeating the above-described process. The above-described printing start point is referred to as a first reference point at which the unlimited movable printing apparatus 10 compares the current location data with the data and prints the content. That is, the printing start point may be the first reference point indicating a printing start of one of all printing sections that are to be performed by the unlimited movable printing system. Thus, a plurality of consecutive first reference points may be provided to all printing sections. This applies to the embodiments described with reference to FIGS. 11 and 12 below.

Figure 11:
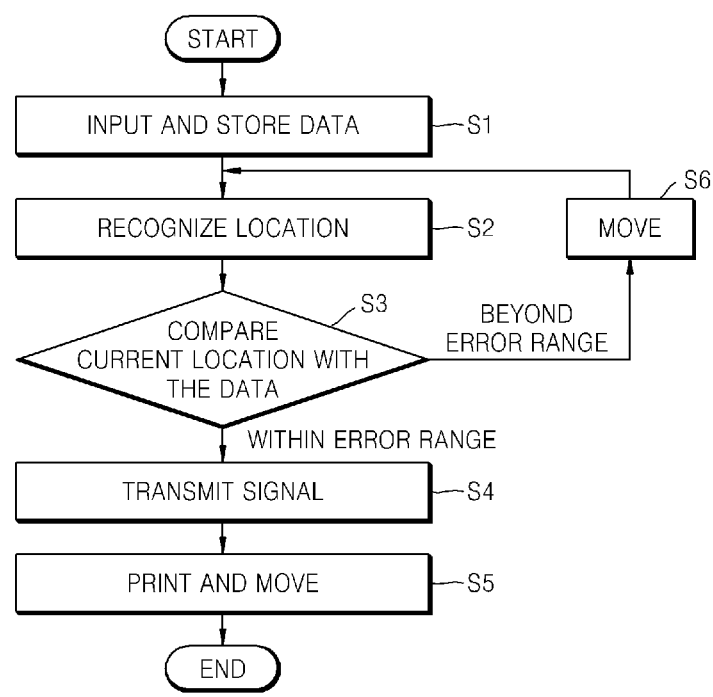
FIG. 11 is a flowchart of another example of a printing method performed by the unlimited movable printing system of FIG. 1.

FIG. 11 is a flowchart of another example of a printing method performed by the unlimited movable printing system of FIG. 1. Unlike the embodiment described with reference to FIG. 10, in the embodiment of FIG. 11, even in a case where a current location is not identical to a printing start point, if a difference between the current location and the printing start point is within a previously set error range, printing is initiated (operation S5) after the operation (S4) of transmitting the printing signal. If the difference between the current location and the printing start point exceeds the previously set error range, the operation (S6) of moving the unlimited movable printing apparatus 10 is performed.

Figure 12:
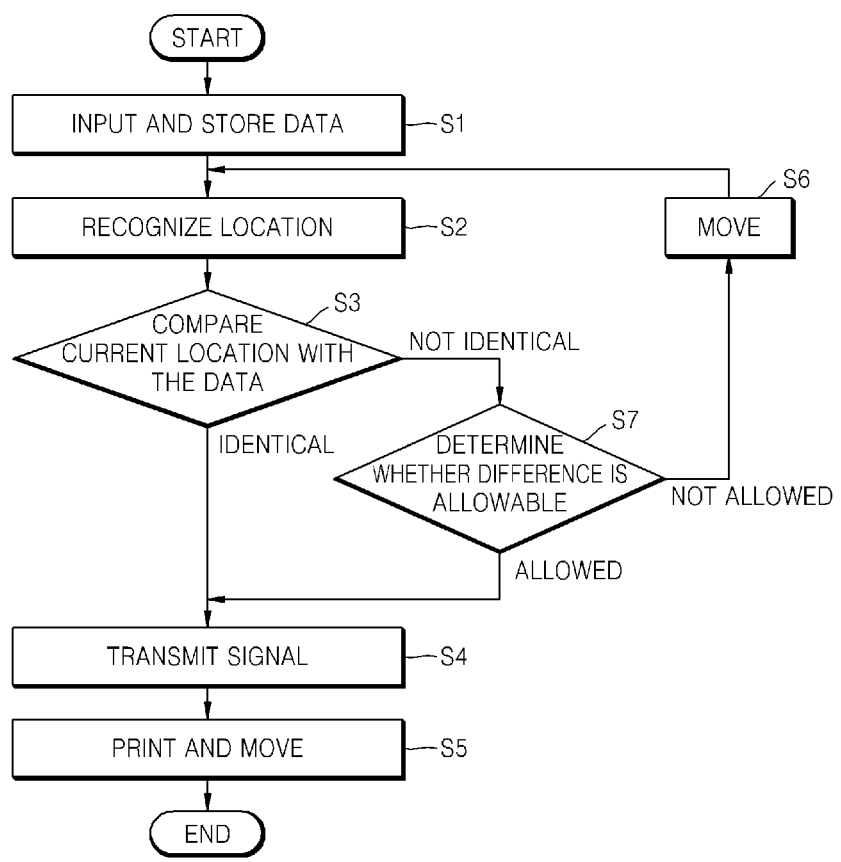
FIG. 12 is a flowchart of another example of a printing method performed by the unlimited movable printing system of FIG. 1.

FIG. 12 is a flowchart of another example of a printing method performed by the unlimited movable printing system of FIG. 1. Unlike the embodiment described with reference to FIG. 10, in the embodiment of FIG. 12, in a case where a current location is not identical to a printing start point, a user may determine whether the difference between the current location and the printing start point is allowable (operation S7). If the user determines that the difference is allowable, printing is initiated (operation S5) after the operation (S4) of transmitting the printing signal. Otherwise, if the user determines that the difference is not allowable, the operation (S6) of moving the unlimited movable printing apparatus 10 is performed. Although this is not shown, as shown in FIG. 11, in a case where the difference between the current location and the printing start point exceeds the previously set error range, the user may determine whether the difference is allowable.

Figure 13:
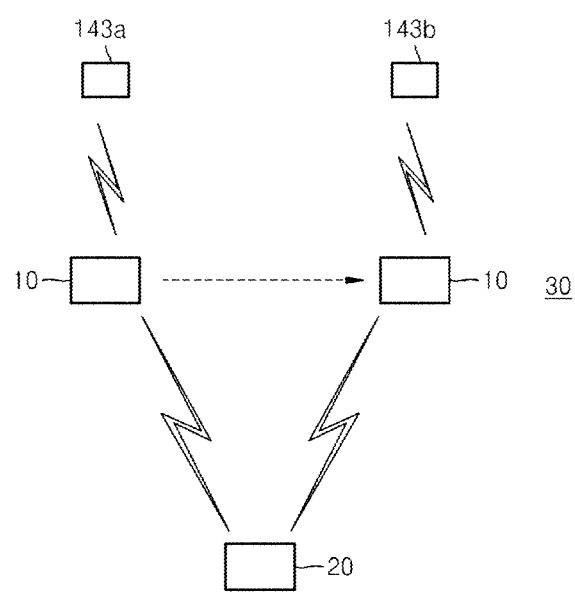
FIG. 13 is a diagram of another example for explaining an installation status of the unlimited movable printing system of FIG. 1.
Figure 14:
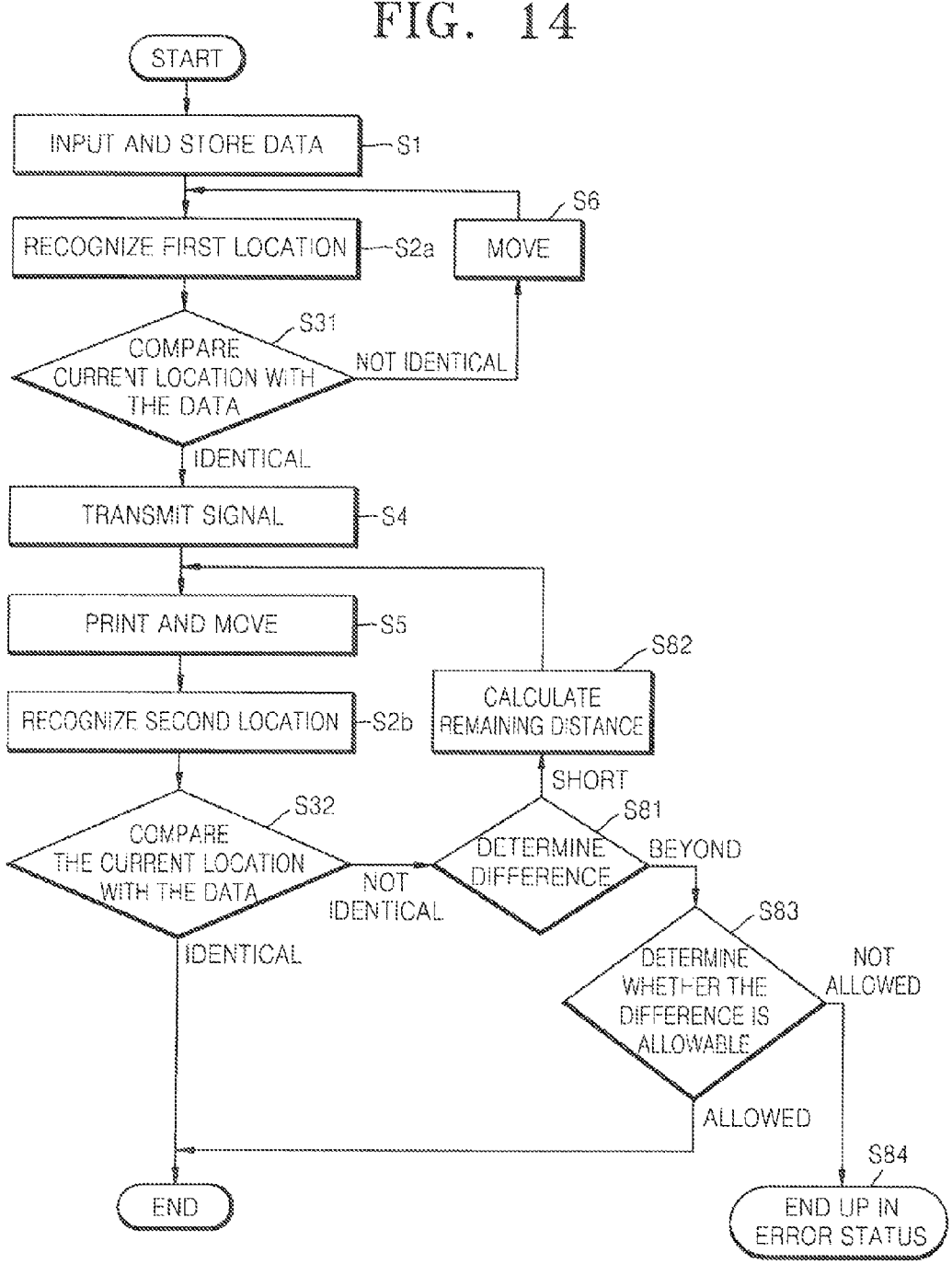
FIG. 14 is a flowchart of another example of a printing method performed by the unlimited movable printing system of FIG. 1.

FIG. 13 is a diagram of another example for explaining an installation status of the unlimited movable printing system of FIG. 1. FIG. 14 is a flowchart of another example of a printing method.

As shown in FIG. 13, a first recognition unit 143a and a second recognition unit 143b may be disposed at a work site. The unlimited movable printing system recognizes a first location through the first recognition unit 143a (operation S2a), and a second location through the second recognition unit 143b (operation S2b). A plurality of recognition units may be further disposed between the first recognition unit 143a and the second recognition unit 143b, and thus a current location of the unlimited movable printing apparatus 10 may be recognized in real time.

The unlimited movable printing system compares data with the current location determined through the operation (S2a) of recognizing the first location (operation S31), discovers the printing start point as shown in FIG. 10 and performs a printing job (operation S5). These processes of discovering the printing start point and performing the printing job may also be applied to the embodiments of FIGS. 11 and 12.

Next, the unlimited movable printing system compares the data with a current location determined through the operation (S2b) of recognizing the second location (operation S32). In this regard, the second recognition unit 143b may be recognized as a printing end point.

In a case where the current location determined through the operation (S2b) of recognizing the second location is identical to an end point on the data, the unlimited movable printing system completes the printing job. Otherwise, in a case where the current location determined through the operation (S2b) of recognizing the second location is not identical to the end point on the data, a difference between the current location and the end point on the data is determined (operation S81). In a case where the current location is short of the end point on the data, a remaining distance is calculated (operation S82). Thus, the unlimited movable printing system continuously performs the printing and moving jobs (operation S5). In a case where the current location exceeds the end point on the data, the unlimited movable printing system determines whether a difference between the current location and the end point on the data is allowable (operation S83). If the difference is determined to be allowable, the unlimited movable printing system completes the printing job. Otherwise, if the difference is determined not to be allowable, the unlimited movable printing system ends up in an error status (operation S84). In a case where the unlimited movable printing system ends up in the error status, a user needs to correct an error at the work site.

When the unlimited movable printing system compares the current location with the data (operation S32) after the operation (S2b) of recognizing the second location, a difference between the current location and the printing start point is within a previously set error range may be determined as described in the embodiment of FIG. 11 and a user can determine whether the difference is allowable as described in the embodiment of FIG. 12.

The above-described printing start point is referred to as a first reference point at which the unlimited movable printing apparatus 10 compares the current location data with the data and prints the content, and the above-described printing end point is referred to as a first reference point at which the unlimited movable printing apparatus 10 compares the current location data with the data and stops printing the content. That is, the printing start point may be the first reference point indicating a printing start of one of all printing sections that are to be performed by the unlimited movable printing system, and the printing end point may be the second reference point indicating a printing end of one of all printing sections that are to be performed by the unlimited movable printing system. Thus, a plurality of pairs of consecutive first reference points and second reference points may be provided to all printing sections.

The above-described printing method may measure a work site, perform a simulation, compare data measured through the simulation with original data, and indicate error information in the original data without performing a printing job by using the unlimited movable printing apparatus 10.

For example, the unlimited movable printing system determines whether to perform the simulation, and, if the unlimited movable printing system determines that the simulation is not to be performed, performs the printing job as described in the embodiments of FIGS. 8, 11, and 12 and/or FIG. 14.

If the unlimited movable printing system determines that the simulation is to be performed, the unlimited movable printing system performs the job as described in the embodiments of FIGS. 8, 11, and 12 and/or FIG. 14.

During the simulation, the unlimited movable printing system may compare the measured data with the original data, report a result of the comparison to an operator or indicate a difference therebetween in the original data.

Also, during the printing job, the unlimited movable printing system may compare the measured data with the original data and additionally print error information on a work side at the work site. The error information may be continuously feedback to the original data and indicated in the original data. For example, the measured data is indicated in a CAD file to compare the original data with the measured data.

The sensing unit 41 of the location detection unit 14 may measure a distance of the work side at the work site, and reflect a scale desired by the user based on a value of the measured distance to perform a printing job. That is, in a case where the work side is inclined, a measured distance value may be greater than a distance value on the blueprint. In this case, the scale of the original data may be corrected to perform the printing job.

Figure 15:
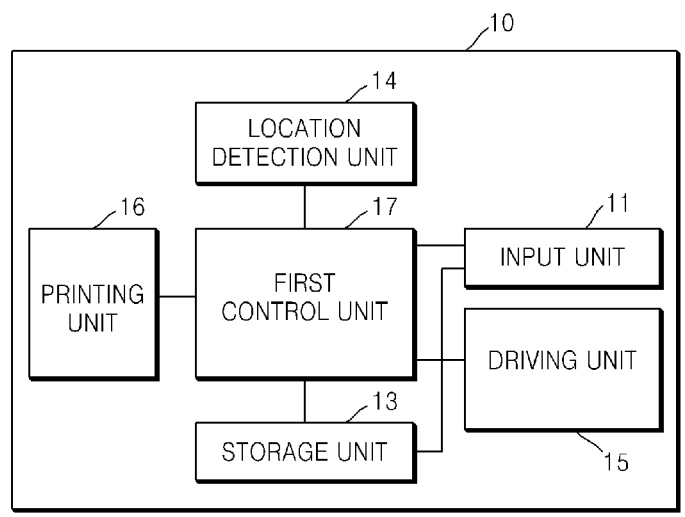
FIG. 15 is a block diagram of an unlimited movable printing system according to another embodiment of the present invention.

In the above-described embodiments, although the control apparatus 20 is separated from the unlimited movable printing apparatus 10 to control driving of the unlimited movable printing apparatus 10 as shown in FIG. 1, the present invention is not limited thereto. That is, as shown in FIG. 15, the unlimited movable printing apparatus 10 may include an input unit 11 and a storage unit 13 to directly input and store data in the unlimited movable printing apparatus 10.

Figure 16:
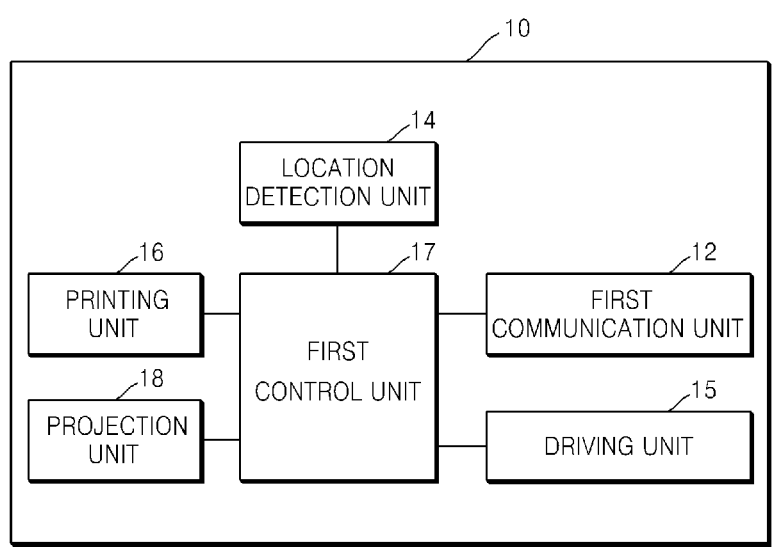
FIG. 16 is a block diagram of an unlimited movable printing system according to another embodiment of the present invention.

FIG. 16 is a block diagram of an unlimited movable printing system according to another embodiment of the present invention. The unlimited movable printing system of FIG. 16 further includes a projection unit 18 connected to the first control unit 17, compared to the unlimited movable printing system of FIG. 1.

The projection unit 18 includes a beam projector that is configured to irradiate an image sent from the first control unit 17 onto a projection side of a work site. The projection unit 18 is configured to irradiate an image of original data toward the projection side. Accordingly, an image of data, for example, a specific design blueprint, may be irradiated onto the projection side. Thus, the unlimited movable printing apparatus 10 may move to a previously set location and project a blueprint image toward the projection side. The projection side may be a wall or a ceiling included in the work site but the present invention is not limited thereto.

According to the image irradiated and projected by the projection unit 18, a builder may exactly understand the locations and shapes of various electric devices that are to be installed in the work side and/or the projection side, electronic devices, building equipments, parts, for example, windows and doors, signs, tiles, etc., thereby further enhancing a building accuracy.

The location detection unit 14 may measure a distance of the work side in the work site and irradiate an image in which a scale desired by a user is reflected based on a value of the measured distance. Also, like the above-described printing job, the location detection unit 14 may irradiate the image in consideration of an inclination degree of the projection side. The location detection unit 14 may split the original data to allow the unlimited movable printing apparatus 10 to project continuously split images while moving, thereby enhancing work efficiency. In a case where the unlimited movable printing apparatus 10 projects the continuously split images while moving, a projection job may be replaced with the printing job described in the embodiments of FIGS. 8, 11, and 12 and/or FIG. 14.

Although the projection unit 18 of the embodiment described with reference to FIG. 16 is added to the embodiment described with reference to FIG. 1, the present invention is not necessarily limited thereto. The projection unit 18 may be added to the embodiment described with reference to FIG. 15.

The data and/or original data described in the present specification may be previously prepared 2D and/or 3D data information.

Further, a plurality of the unlimited movable printing apparatuses 10 may be connected in parallel to each other to concurrently perform multiple jobs.

As described above, according to embodiments of the present invention, an operator can accurately print original data on a work side.

Also, such printing of the same content can be unlimitedly repeated.

A blueprint can be projected on a projection surface, thereby further enhancing a building accuracy.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A freely movable printing system comprising:
    an input unit configured to input data regarding content that is to be printed;
    a storage unit configured to store the data;
    a printing unit configured to print the content corresponding to the data on a work side;
    a driving unit configured to freely move at least a part of the freely movable printing system comprising the printing unit in a work site comprising the work side;
    at least one recognition unit located at the work site;
    a sensing unit configured to sense the at least one recognition unit;
    a location signal generation unit that is electrically connected to the sensing unit and configured to generate a location signal based on information regarding the at least one recognition unit sensed by the sensing unit; and
    a control unit that is connected to the input unit, the storage unit, the printing unit, the driving unit, and the location signal generation unit, configured to compare the location signal received from the location signal generation unit with the data, calculate a current location of the at least a part of the freely movable printing system comprising the printing unit, operate the driving unit and the printing unit, and print the content corresponding to the data on the work side.

2. The freely movable printing system of claim 1, wherein the sensing unit comprises a distance measurement sensor, a light sensor, or a radio wave sensor that is configured to sense the at least one recognition unit.

3. The freely movable printing system of claim 1, wherein the freely movable printing system comprises a freely movable printing apparatus comprising at least the printing unit, the driving unit, the sensing unit, and the location signal generation unit and a control apparatus comprising the input unit and the storage unit, wherein the control unit comprises:
    a first control unit that is electrically connected to the printing unit, the driving unit, the sensing unit, and the location signal generation unit, and located at the freely movable printing apparatus; and
    a second control unit that is electrically connected to the input unit and the storage unit, and located at the control apparatus, and
    wherein the freely movable printing apparatus and the control apparatus are configured to communicate with each other.

4. The freely movable printing system of claim 3, wherein the freely movable printing apparatus further comprises a second storage unit.

5. The freely movable printing system of claim 3, wherein the freely movable printing system comprises a freely movable printing apparatus comprising the printing unit, the driving unit, the input unit, the storage unit, the sensing unit, the location signal generation unit, and the control unit.

6. The freely movable printing system of claim 1, wherein the input unit is configured to input data regarding projection content, and
    wherein the freely movable printing system further comprises a projection unit configured to project content corresponding to the data regarding the projection content and that is electrically connected to the control unit.

7. A printing method comprising:
    inputting and storing data regarding content that is to be printed in a freely movable printing apparatus comprising at least a sensing unit, a location signal generation unit, a driving unit, and a printing unit;
    sensing at least one recognition unit located at a work site, wherein the sensing is performed by the sensing unit;
    generating a location signal based on information regarding the sensed at least one recognition unit, wherein the generating is performed by the location signal generation unit that is electrically connected to the sensing unit;
    comparing the location signal received from the location signal generation unit with the data and calculating a current location of the freely movable printing apparatus, wherein the comparing is performed by a control unit that is electrically connected to the location signal generation unit;
    comparing the current location with the data, wherein the comparing is performed by the control unit; and
    operating the driving unit and the printing unit, and printing the content corresponding to the data on a work side of the work site from a printing start point, wherein the operating is performed by the control unit, and the printing is performed by the freely movable printing apparatus that is moving.

8. The printing method of claim 7, wherein the comparing of the current location with the data comprises: in a case where the current location is identical to the printing start point, printing the content corresponding to the data on the work side of the work site from the printing start point, and, in a case where the current location is not identical to the printing start point, operating the driving unit and moving the freely movable printing apparatus to the printing start point, wherein the operating is performed by the control unit.

9. The printing method of claim 8, wherein the comparing of the current location with the data further comprises: in a case where the current location is not identical to the printing start point, determining whether a difference between the current location and the printing start point is allowable, in a case where it is determined that the difference is allowable, printing the content corresponding to the data on the work side of the work site from the printing start point, and, in a case where it is determined that the difference is not allowable, operating the driving unit and moving the freely movable printing apparatus to the printing start point, wherein the operating is performed by the control unit.

10. The printing method of claim 8, wherein the comparing of the current location with the data further comprises: in a case where the current location is not identical to the printing start point, determining whether the difference between the current location and the printing start point is within a previously set error range, in a case where it is determined that the difference is within the previously set error range, printing the content corresponding to the data on the work side of the work site from the printing start point, and, in a case where it is determined that the difference exceeds the previously set error range, operating the driving unit and moving the freely movable printing apparatus to the printing start point, wherein the determining is performed by the control unit.

11. The printing method of claim 8, wherein the calculating of the current location of the freely movable printing apparatus comprises:
calculating a first location of the freely movable printing apparatus; and
calculating a second location of the freely movable printing apparatus, wherein the comparing of the current location with the data comprises:
determining whether the first location is identical to the printing start point; and
comparing whether the second location is identical to a printing end point.

12. The printing method of claim 11, further comprising: in a case where the second location is identical to the printing end point, operating the printing unit and ending the printing, and, in a case where the second location is not identical to the printing end point, calculating a remaining distance, wherein the operating is performed by the control unit.

13. The printing method of claim 11, further comprising: in a case where the second location is identical to the printing end point, operating the printing unit and ending the printing, and, in a case where the second location is not identical to the printing end point, determining whether a difference between the second location and the printing end point is allowable, wherein the operating is performed by the control unit.

14. The printing method of claim 7, further comprising:
inputting and storing data regarding projection content in the freely movable printing apparatus; and
projecting the projection content onto a projection side of a work site through the freely movable printing apparatus, wherein the projecting is performed by the control unit.

15. The printing method of claim 7, further comprising: simulating the content that is to be printed, wherein the simulating is performed by the freely movable printing apparatus that is moving.

* * * * *